United States Patent
Papineau et al.

[11] Patent Number: 5,907,537
[45] Date of Patent: May 25, 1999

[54] OA&M SYSTEM

[75] Inventors: Mario R. J. Papineau, Orleans; Christopher R. Solar; Pierre A. Hamel, both of Ottawa; Eric Fredine, Toronto; Ian W. Olthof; Mathew N. Perkins, both of Calgary, all of Canada

[73] Assignee: Northern Telecom Limited, Montreal, Canada

[21] Appl. No.: 08/896,978

[22] Filed: Jul. 18, 1997

[51] Int. Cl.⁶ ...................................................... H04J 3/12
[52] U.S. Cl. .......................................... 370/254; 379/201
[58] Field of Search ..................................... 370/384, 426, 370/254, 252, 241, 242, 250, 255, 256, 357, 360, 381, 382; 379/242, 201, 207, 211, 221, 222, 233; 395/200.5, 200, 610

[56] References Cited

U.S. PATENT DOCUMENTS

| | | | |
|---|---|---|---|
| 4,924,510 | 5/1990 | Le | 379/207 |
| 4,928,304 | 5/1990 | Sakai | 379/207 |
| 5,323,452 | 6/1994 | Dickman et al. | 379/207 |
| 5,483,585 | 1/1996 | Parker et al. | 379/207 |
| 5,560,004 | 9/1996 | Weng et al. | |
| 5,579,300 | 11/1996 | Lee et al. | |

*Primary Examiner*—Huy D. Vu

[57] ABSTRACT

An OA&M system is provided for a network communication core having a switch, a controller, and a core configuration memory. All configuration information which is static (i.e., information which remains the same regardless of the configuration of the core) is placed off-core in a map file. Because of this, requests for information on the configuration of the core may often be satisfied without the need to query the core, thereby reducing core load. Further, this static information in the map file allows validation of requests for dynamic configuration information as well as requests for reconfiguration of the core. In other words, the static information assists in ensuring that requests are proper. The static information in the map file is presented as "list", "attribute", and "choice" features. This presentation facilitates the making of OA&M requests by a user. The features become arguments of functions in order to generate OA&M requests to the controller. Each function received by the controller is converted to instructions for the core by an interface and a map file in the core. The features in the off-core map file are organised into a hierarchical tree (a feature tree) and the off-core map file may be accessed by a browser program of a personal computer so that levels of the tree may be displayed, thereby facilitating quick configuration requests.

9 Claims, 4 Drawing Sheets

Key(setID, 2)

{
    tKeyRange(setID, 0, 20, 1);
    tKeyPrefix(setID, "set");
    tKeyBase(setID, 1);
    tKeyPad(setID, 2);
} node(TermsNSets, {}, "Terminals & sets", list(setID), statVis, Basic)

{
    membership(static, {SetX});
} node(SetX, {setID}, "", heteroList, statVis, Basic)
    {
        membership(dynamic, {SetName, SetType});
    {
        node(SetName, {setID}, "Set name", editAttr, statVis, Basic)
    {
            attribute(rw, static, dataType(ftString, 7));
            editSpec(1, 7);
    } node (SetType, {setID}, "Set type", choiceAttr, dynVis, Installer)
        {
            attribute(rw, dynamic, dataType(ftByte, 1));
            tValue(0, "Basic set");
            tValue(1, "Square set");
            tValue(2, "Feature set");
            tValue(3, "Expanded set");
        }

FIG. 4

OA&M SYSTEM

FIELD OF THE INVENTION

This invention relates to an OA&M system for a network communication core and to a method for permitting OA&M in a network communication core.

BACKGROUND OF THE INVENTION

A network communication core, such as a private branch exchange (PBX), comprises a switch, a switch controller, and a core memory. Communication devices, such as telephones and trunk lines, are connected to the switch. The controller establishes pathways through the switch and provides services to facilitate communications. For example, if one telephone set dials a destination number (DN) of another telephone set on the switch, the controller may, first establish a pathway through the switch to the destination set and, if the destination set does not go off-hook after a certain number of rings, forward the call to another telephone set on the switch. Additionally, when one telephone set dials another, the controller may pass a call line identification (CLID) to the destination set prior to the first ringing signal. The manner in which the controller handles communications on the network depends upon the network configuration; the core memory stores the configuration information for the core.

On installation of a network it is necessary to store configuration information for the network. Further, at different times, it may be desirable to change the network configuration or simply determine an aspect of the current configuration. These functions in a network are known as Operations, Administration, and Maintenance (O&AM).

One known method of permitting OA&M in a PBX is to provide telephone sets with displays. Then, by dialling a special code and entering a password, an OA&M menu in the controller may be accessed. By working through this menu, the controller may be passed reconfiguration information. When the controller receives reconfiguration information it first validates the information (e.g., checks that the data fits certain parameters, such as the maximum length for a name to be associated with a telephone set). If the data is valid, it is stored in the memory thereby reconfiguring the network.

One drawback to this method of OA&M is that it can only be performed on-site; that is, via a telephone attached to the controller. It is desirable to be able to reconfigure a controller from a remote location. Another shortcoming of set-based OA&M is that the User Interface (UI) of the OA&M system is limited by the telephone set, which typically has a small display and a few buttons. This limits the amount and complexity of data which can be presented to the OA&M user.

A Personal Computer (PC) can also be used to provide access to OA&M functions on the controller. This PC could be located remotely from the controller, in which case it would connect to the controller over the network; alternatively, the PC could be located on-site with the controller. In either case, software running on the PC extracts configuration data from the controller and displays it on the PC screen. When the PC user changes this data, it is passed back to the controller. The responsibility for validating this reconfiguration data may fall on the PC software, or the controller, or both.

Having the PC software perform validation of reconfiguration data is advantageous in that it generally allows a more sophisticated and robust interface to the PC user. Also, this method reduces the amount of communication needed between the PC and the controller. A drawback of this method is that the PC software then becomes specific to a particular controller: it must implement the rules that govern the configuration data, and these rules may change from one controller variant to the next.

Alternatively, the PC can simply act as a "dumb terminal", providing input and output (via the keyboard and screen) for the remote user. All outputs (displays) are generated by the controller, and all input (reconfiguration data) validation is provided by the controller. While this allows the PC software to be generic with respect to controller variants, it has the drawback of being slow. All the data displayed by the PC is passed from the controller to the PC over the network. All the data entered by the PC is passed back to the controller over the network. The controller is burdened with these tasks, thus slowing the overall performance of the core.

This invention seeks to overcome drawbacks of known OA&M systems.

SUMMARY OF THE INVENTION

According to this invention, there is provided an OA&M system for a network communication core having a switch, a controller, and a core configuration memory, comprising: an off-core map storing static information respecting features, which features are for configuring said core; an off-core server for receiving an off-core OA&M request and for, initially, looking to said off-core map for information to respond to said request and, if information is found in said map to respond to said request, responding to said request with said information and, if information is not found in said map to respond to said request, constructing a function to pass said off-core OA&M request to said controller and for responding to said off-core OA&M request based on a response from said controller to said function.

According to another aspect of this invention, there is provided a method for permitting OA&M in a network communication core having a switch, a controller, and a core configuration memory, comprising the steps of: storing in an off-core map static information respecting features, which features are for configuring said core; receiving off-core an off-core OA&M request; responsive to said off-core OA&M request, initially looking to said off-core map for information to respond to said request and, on finding information in said map to respond to said request, responding to said request with said information and, on not finding information in said map to respond to said request, constructing a function to pass said off-core OA&M request to said controller and responding to said request based on a response from said controller to said function.

BRIEF DESCRIPTION OF THE DRAWINGS

In the figures which illustrate example embodiments of the invention,

FIG. 4 is a tree diagram illustrating, at a detail level, a portion of a feature tree in accordance with this invention.

DETAILED DESCRIPTION OF THE PREFERRED EMBODIMENTS

In overview, the present invention puts all information which is static (i.e., information which is the same regardless of the configuration of the core) off-core in a map file. Because of this, requests for information on the configuration of the core may often be satisfied without the need to query the core, thereby reducing core load. Further, this static information in the map file allows validation of requests for dynamic configuration information as well as requests for reconfiguration of the core. In other words, the static information assists in assuring that the requests are proper. For example, the static information may indicate that only pulse and tone dialling are supported by the core in which case only requests to change the dialling mode of the core to one of these two supported modes will be permitted.

The features in the off-core map are organized into a hierarchical tree (a Feature Tree (FT)) and the off-core map file may be accessed by a browser program on the PC. This program displays the levels of the tree and their contents, thereby facilitating quick reconfiguration requests.

All of the information which defines the characteristics of one variant of core controller versus another is contained in the map file; the PC browser software itself is entirely generic. The same browser application on the PC can be used to reconfigure any core variant provided the map file for that variant is present on the PC.

Each feature in the map file is classified as being one of three types: "list", "attribute", and "action". These distinctions allow the PC to generate useful displays of the tree structure and contents. The features become arguments of functions in order to generate OA&M requests to the controller. Each function received by the controller is converted into instructions for core data handlers by an interface engine. A core data handler is responsible for managing access (reading and/or writing) to a particular portion of the core configuration data.

Figure 1:
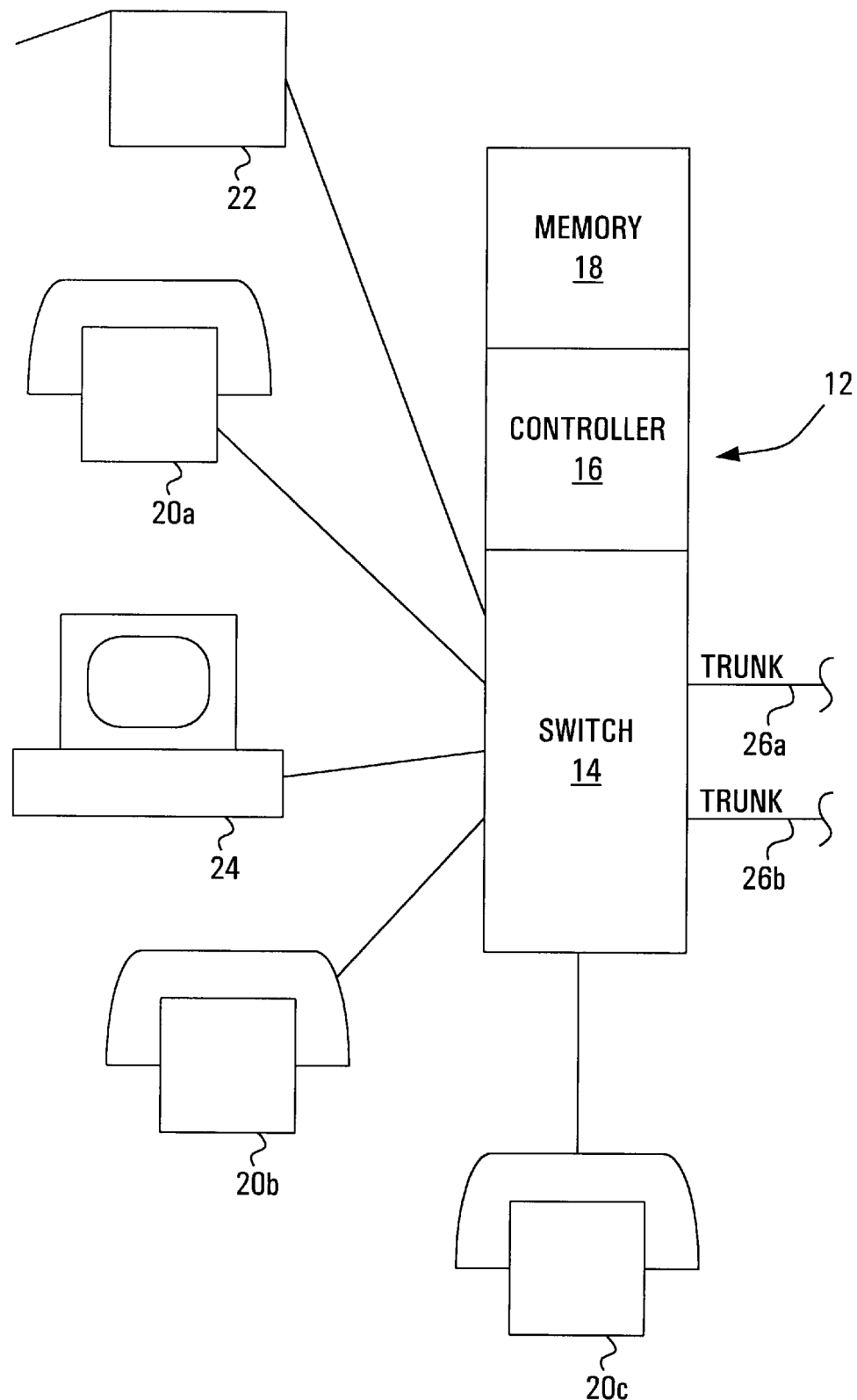
FIG. 1 is a schematic diagram of a network communications system used with this invention.

Turning now to FIG. 1, a network communications system illustrated generally at 10 has a network communications core 12 comprising switch 14, controller 16, and core memory 18. A number of communications devices such as telephone sets 20a, 20b, 20c, fax machine 22, and personal computer (PC) 24 are connected to the switch 14 as are trunk lines 26a, 26b from the public switched telephone network (PSTN). The core memory 16 stores configuration information for the core.

Figure 2:
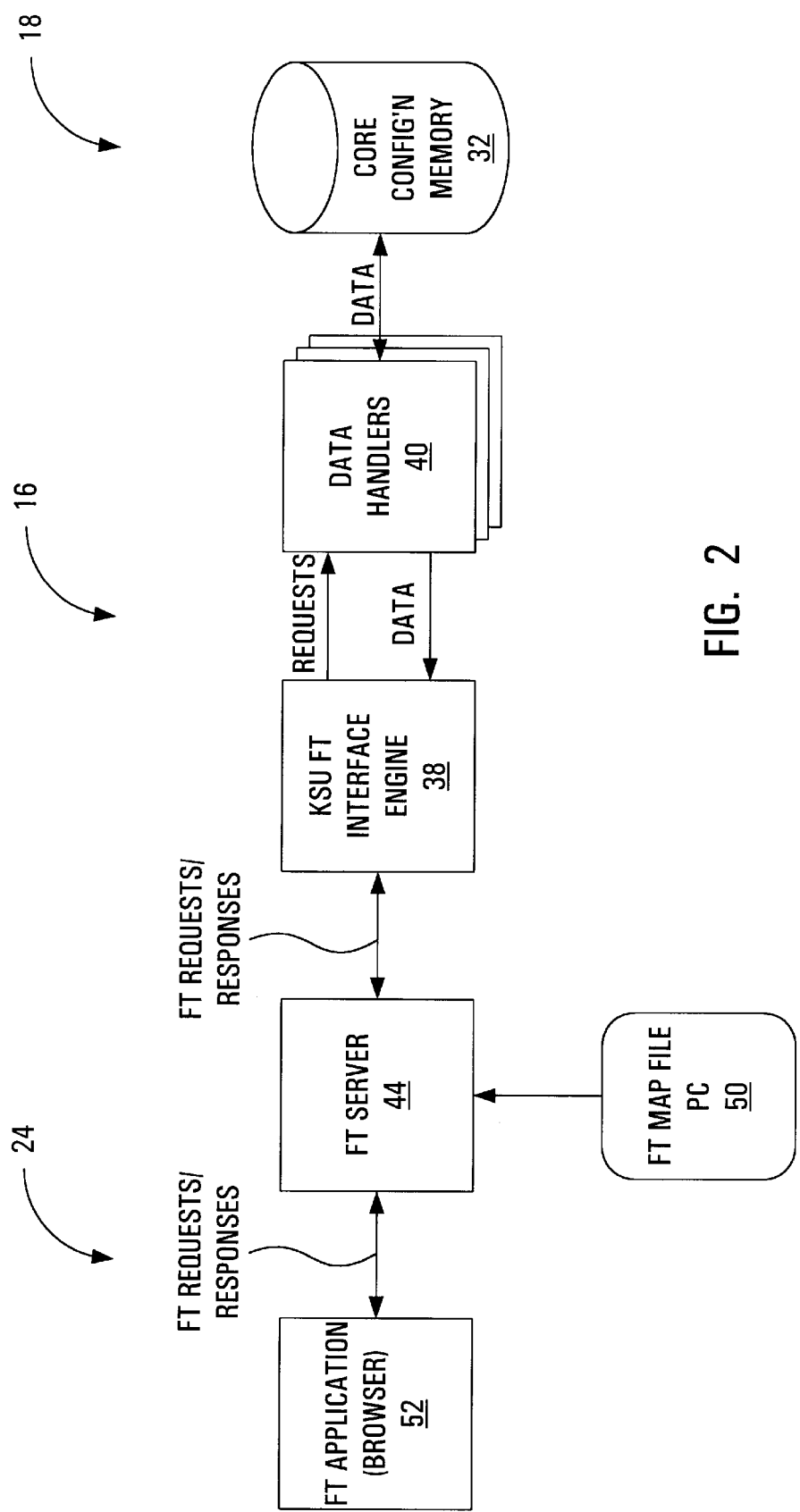
FIG. 2 is a block diagram illustrating an embodiment of this invention.

A portion of the controller, memory, and PC are detailed in FIG. 2. Turning to FIG. 2, the controller 16, which is also known as the Key System Unit (KSU), comprises a Feature Tree (FT) interface engine 38 connected for two-way communication with a collection of core data handlers 40. These data handlers are connected for two-way communication with the core configuration memory 32 of memory 18. The KSU FT interface 38 is connected for two-way communication via a network pathway with an FT server 44 on the PC 24.

In the PC (which is remote from the core, and is, therefore, off-core), the FT server 44 is connected for one-way communication with a read-only FT map file 50 and with an FT application, in particular, the FT browser 52. The FT server, FT map file, and FT browser may all be implemented in software in a general-purpose PC. The FT map file 50 stores a feature tree which is a hierarchical arrangement of the configuration features of the core.

The FT browser 52 is a user interface allowing a user to input OA&M requests. More particularly, it presents the KSU's 16 configuration in a browsable, hierarchical list utilizing feature tree data obtained from the FT server 44. The KSU configuration data is displayed as a tree list of attributes, and the attributes are displayed using text fields, check boxes, drop-down lists, and the like. All information concerning how a particular feature in the tree is to be displayed is contained in the FT map file 50. When the user manipulates this interface (e.g., by expanding a new level of the tree or by attempting to change a value), the FT browser sends OA&M requests to the FT server 44.

Figure 3:
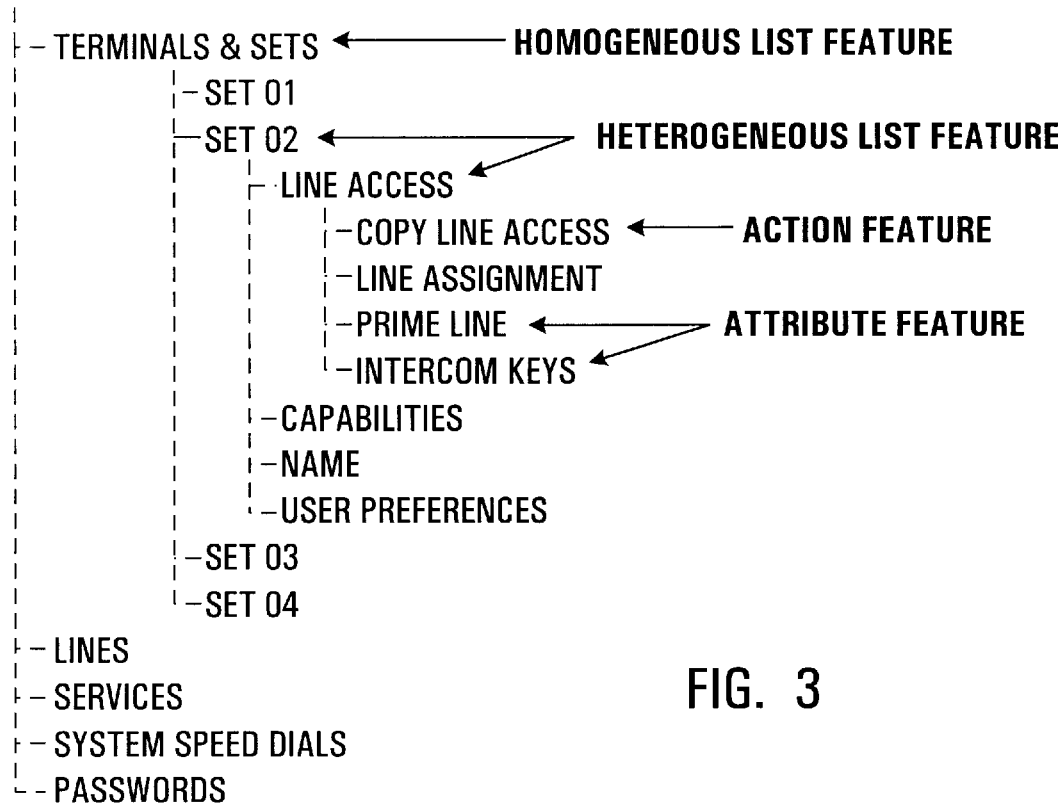
FIG. 3 is a tree diagram illustrating, at a high level, a portion of a feature tree in accordance with this invention.

When receiving an OA&M request, the FT server 44 queries the FT map file 50. If appropriate information is available in the FT map file, the FT server responds to the request with this information. If appropriate information is not available, the FT server constructs a function request which it passes to the KSU/FT interface 38 over the network pathway. As aforenoted, the FT map file 50 stores a feature tree. Each node in the tree (other than the root node) is a sub-feature of a feature the next level up in the tree. A portion of an exemplary feature tree is illustrated in FIG. 3. Turning to FIG. 3, it will be noted that the following types of features are presented in the feature tree:

1. Lists

A list feature is actually a header for a list (collection) of features. There are two types of lists: homogeneous lists and heterogeneous lists. A homogeneous list contains multiple instances of the same feature; for example a list that contains one member for each telephone set on the core is a homogeneous list. The membership (range of instances) for a homogeneous list may be static or dynamic, according to definitions in the FT map file. A dynamic homogeneous list may also allow list members (instances) to be added or removed.

A heterogeneous list is a collection of dissimilar items. Heterogeneous list members cannot be added or removed, although possibly not all members will be visible at all times. The FT map file defines whether the membership of a heterogeneous list is static or dynamic, and if it is dynamic, which member features have dynamic visibility.

2. Attributes

There are two types of attributes: choice attributes and edit attributes. With a choice attribute, the core supports one of several discrete choices for the attribute. These choices may be static (i.e., they remain the same irrespective of core configuration) or dynamic (i.e., the available choices depend upon the core configuration). An example choice would be dialling mode, for which there may be static choices "tone" and "pulse". An edit attribute is an attribute that the user may specify freely within some basic constraints, such as a minimum and maximum number of characters. An example of an edit attribute would be the name associated with a telephone set: the user may enter any string between 1 and 7 characters long, with no blank spaces. The rules for what constitutes valid entries for an edit attribute (referred to as the edit specification) are defined in the map file if they are static; otherwise, the FT server must query the KSU for this information.

3. Actions

Action features are used to invoke operations on the core; for example, an action feature may allow the user to enable or disable a device connected to the core. An action feature may have parameters (i.e. "attributes") associated with it; values must be specified for these parameters before the action can be invoked. An example of an action with parameters would be the copy set data action: the DN of the copy destination must be specified by the user. Action attributes are specified in the FT map as children of the action feature; in this respect, action nodes are similar to heterogeneous lists.

Each feature in the FT map file has certain information associated with it which defines the feature. This feature-defining information is as follows:

Type
One of homogeneous list, heterogenous list, choice attribute, edit attribute, or action.

Feature ID
The Feature ID (FID) is a unique identifier for the feature. A given feature is identified with the same FID across all core variants. This allows PC applications that are concerned with specific features to locate those features in any feature tree.

Key List
The key list identifies how a particular instance of a tree feature is to be addressed. For example, the "SetName" feature (the name assigned to a telephone set) is defined with a key list of {setID}. When the FT server sends queries to the core for this feature, a setID key value is needed to identify a particular set.

A key is composed of two portions: the prefix and the index. The prefix identifies the type of the key (in this case, setID is the prefix). The index identifies the numeric value of the key. The combined (prefix:index) pair identifies a particular item on the core; for example, (setID:3) identifies the third telephone set in the system. If the FT server sends a query to the KSU containing the "SetName" FID and a key list of (setID:3), then it is clear to the core software that what is being accessed is the name data for the third set on the system.

Note that the feature definitions in the FT map file 50 do not contain key index values; only key prefixes (types) are used in the feature definition's key list. For example, there is only one "SetName" feature defined in the FT map (with a key list of {setID}, regardless of how many index values are possible for the setID key. However, the FT map file 50 for a core variant does define all the keys types and their index ranges, but the key definitions are separate from the feature definitions.

Label
This provides a display string used to represent the feature in the user interface.

Visibility
This defines whether the feature has static or dynamic visibility. A feature with static visibility is always visible to the user; that is, the feature's visibility does not depend on core configuration. A feature with dynamic visibility may or may not be visible, depending on the core configuration. If a feature has dynamic visibility, the FT server determines its status (visible or not) by querying the core.

Access Class
This parameter allows certain parts of the OA&M tree to be hidden from users based on the users' class. For example, a user with a class of "Installer" may be granted access to all areas of the OA&M tree, whereas a user with a class of "Basic" may be restricted to accessing a limited set of simple features. Each feature in the tree is associated with an access class; this defines the lowest user category for which the feature is visible.

This basic tree node (feature) definition information appears in a node primitive in the FT map file in the following form:

node(<FID >, {<Key List>}, "<Label>", <Attribute Type>, <Visibility>, <Access Class>)
{
}

Using the set name example:
node(SetName, {setID}, "Set name", editAttr, StatVis, Basic)
{
}

There are other feature definition primitives which only apply to certain types of features. These primitives are used within the body of a node definition (that is, between the braces that follow the node primitive. For example, "membership" is a feature definition primitive which applies to list and action features.

Membership
This applies to list features (homogeneous and heterogeneous) and to actions (with parameters). This primitive defines the group of features that are members of the list. For action features, the membership primitive defines the set of parameter attributes associated with the action.

The membership for a list or action feature can be static or dynamic. Static membership means that the membership is as it is set out in the FT map file, and is independent of system configuration. Dynamic membership implies that the FT server must query the KSU to determine the actual membership.

Similarly, there are feature definition primitives which only apply to attribute features. Some examples are defined below.

Attribute
This primitive defines an attribute's access type (read/write or read-only), its data type (bit, byte, integer, string, etc.), its size in bytes, and whether the attribute's set of choices (for choice attributes) or edit specification (for edit attributes) is dynamic.

Translations
The translation primitives define how the raw data provided by the KSU is to be displayed to the user. For example, for the dialling mode feature, the KSU may provide raw values of zero or one. These values are to be displayed to the user as "Pulse" and "Tone", respectively. Translation primitives in the dialling mode feature definition would be used to associate '0' with "Pulse" and '1' with "Tone".

The translation primitives are also used to translate user-entered values back into raw data suitable for transmission to the KSU.

For a choice attribute, the translation primitives enumerate all the possible choices for that attribute. If the attribute has dynamic choices (as specified in the Attribute primitive), then not all of these choices are necessarily valid at any given time. The FT server must query the KSU to determine what subset of choices are valid.

Because all translations from raw numbers to display strings are handled locally on the PC, the data transmitted between the PC and the KSU is as compact as possible. This minimizes both the time needed to send data between the PC and KSU, and the real-time performance impact on the KSU during an OA&M session. Furthermore, isolating the string translations in the map file allows multiple languages to be supported without changes to the core software.

Edit Specification

If an edit attribute has a static edit specification, it is defined in the map file using the "editSpec primitive". For string-type edit attributes, this primitive defines the minimum and maximum number of characters allowed. For numeric-type edit attributes, the editSpec primitive defines the minimum and maximum values allowed.

A sample fragment of a map file illustrating these and other primitives is shown in FIG. 4.

This map file sample starts with a definition of the setID key. The key primitive defines a numeric value (2) for the setID key prefix. Within the body of the key definition other properties of the setID key are specified. The tKeyRange primitive defines the overall range of valid setID index values, in this case, from 0 to 20 in increments of 1. The tKeyPrefix primitive indicates that setID key values are to be displayed as the word "Set", followed by the translated index value. The tKeyBase and tKeyPad primitives define the method used to translate setID index values: in this case, a base value of 1 is added to the raw index value, and the index is padded with zeroes to a length of 2 digits. Hence, a key value of (2:7) provided by the KSU would be displayed to the PC user as "Set 08".

Following the key definition are four node (feature) definitions. The TermsNSets feature is a homogeneous list based on the setID key. It has one member, the node SetX. In practice, there will be multiple instances of node SetX; one for each value of setID. The node is only defined once in the map, however. If the TermsNSets node was defined with dynamic membership, then not all values of setID are necessarily valid for addressing the instances of node SetX. The FT server would have to query the KSU to determine the range of valid setID values.

The SetX node is a heterogeneous list which acts as a heading for two attributes that apply to sets: SetName (the name associated with a set) and SetType (the type of hardware installed at this set location). The SetX node has dynamic membership, meaning that these two attributes will not be visible in all situations.

The SetName node is an edit attribute. The attribute primitive specifies that this feature is a read/write string with a maximum size of 7 bytes. This feature has a static edit specification: the set name must be at least one character and at most seven characters in length.

The SetType node is a choice attribute. This node has dynamic visibility, which is the reason for the SetX node having dynamic membership. Furthermore, the access class parameter in the node definition indicates that this node is only visible to installer-class users. The overall set of choices for this node contains four single-byte values. These values and their string equivalents are defined by four tValue primitives. The attribute primitive indicates that this node is dynamic, so not all four values are necessarily valid at all times.

The FT server 44 supports the following functions which are used as the basis for OA&M queries to the KSU 16:

GetValue

This function returns the value of an attribute.

SetValue

This function sets the value of an attribute.

GetChoices

This gets a list of valid choices associated with a choice attribute. This function is only used where the choices are dynamic and, therefore, not available from the FT map file.

GetList

This gets a list of valid key values associated with the members of a homogeneous list feature. For example, a GetList request for the feature TermsNSets might return a list of values like {1, 5, 10 . . . 15}, indicating that the key values 1, 5, 10, 11, 12, 13, 14, and 15 were all valid for members of the list. This function is only used if the membership for a homogeneous list is dynamic; otherwise, the membership can be determined by reading the FT map file.

GetStatus

This function returns the status (visibility) of a feature. This function is only used for features that have dynamic visibility. Features with static visibility are always visible, and hence there is no need to query the KSU for their status.

GetDefault

This function returns the default value for an attribute which has been declared in the FT map as having a dynamic default. This function is not used for attributes that have no default value or which have a static default value.

CheckLabel

This function determines if a string is a valid label for a key; this is only relevant for keys that have dynamic labels. In the map file fragment of FIG. 4, the setID key is defined with a static label method: the index values undergo a simple numeric translation in order to produce a display label. In some cases, a key may have dynamic labels which cannot be defined in the map file. For example, each setID value may correspond to a user-definable DN, and this DN string is what should be used as the label for the key. To display a setID value, the FT server must query the core for the label associated with the key; this can be done with the GetValue function. When a user types in a DN string, though, the FT server must determine if the string is a valid setID label, and if so, which setID index it represents. The CheckLabel function provides this capability.

InvokeAction

This function is used to invoke (trigger) an action feature. If the action feature has parameters, then values for the parameters must be provided (via the SetValue function) prior to the sending of the InvokeAction request.

AddMember

This function is used to add a member to a homogeneous list. This function is only valid for lists declared to have member addition capability.

DeleteMember

This function is used to remove a member from a homogeneous list. This function is only valid for lists declared to have member deletion capability.

In operation, referencing FIG. 2, the PC user may load the FT browser 52 and establish a connection and OA&M session with a KSU 16. Once the session with the KSU is established, the FT browser causes the FT server 44 to call up the first level of the tree for display. This involves the FT Server querying the FT Map 50 for this first level. The FT Map responds with the first level which, if none of the features have dynamic visibility, is then passed by the FT Server to the Browser for display. If, however, the FT Map indicates that any of the features in the first level have dynamic visibility, the FT Server launches a query to the KSU to determine the current visibility of the dynamically visible features. On receiving a reply, the FT Server passes to the Browser only those features of the first level from the FT Map which are visible. The user may then make a request (for example, by mouse-clicking on any of the features in the first level of the tree). The FT browser passes the request to the FT server and the FT server examines the FT map file.

If the required information is contained in the map file, the FT server responds to the FT browsers's request with that information. Otherwise, the FT server formats an FT request message and passes it to the KSU. The KSU FT interface engine 38 invokes a data handler 40 to process the request, and the results of this processing are passed back to the FT server by the KSU FT interface. The FT server processes this data (e.g., translating raw data into display strings) and passes the results to the FT browser.

The operation may be better understood by way of the following examples.

If a user requests a list membership and the membership of the list is static, then the information is in the FT map file and so the FT server responds to the request with the membership information as well as information from the FT map file on how the membership information is to be displayed by the FT browser. This satisfies the request with no query being made to the core. Alternatively, if the membership of the list were dynamic, the FT server would have to query the KSU for the current membership. As a more specific example, referencing the feature tree fragment of FIG. 4, if the heterogeneous list feature for "Set 08" were displayed and the user attempted to "open" this feature (that is, to view the features that are members of list feature "Set 08"), the FT server would determine from the FT map file that the membership for the SetX feature is dynamic, and that the status (visible or invisible) of feature SetType must be determined by querying the KSU. If the KSU responds to this query with a positive result, then the FT server returns a membership of {SetName, SetType} to the FT browser. If the KSU responds with a negative result to the GetStatus query for SetType, then the FT server would report a membership of {SetName}. If the SetX feature were defined with static membership (and the SetType feature had static visibility), then the FT server would examine the FT map file and respond with a membership of {SetName, SetType}, without ever querying the KSU.

If the user instructs the FT browser to display the current value for the SetName feature for "Set 08", the FT server sends a GetValue message to the KSU, specifying the FID (SetName) and the relevant keys (setID:7) as function parameters. The KSU would respond with the current value, which can then be displayed by the FT browser. If the user attempted to supply a new value for the SetName feature, the user input would first be validated by the FT server according to the rules defined in the FT map. In this case, the FT map indicates that the name string must be from one to seven characters in length. If the user attempted to enter an empty string, or a string longer than 7 characters, this value would be rejected by the FT server without the need for any queries to the core. If the user entered a value that satisfies the feature's edit specification, then the new value would be passed to the core via the SetValue function. The parameters of this function would be the FID (SetName), the keys (setID:7), and the new value. The KSU FT interface engine passes this request to the set name data handler, which further validates the value before writing it to core memory. The validation stage in the core data handler is necessary to ensure the integrity of the core configuration data, and because certain features may have validation rules which are too complex to describe with primitives in the FT map file. For example, there may be a rule that no two sets may have the same name. This rule could not be encoded in the map file without making the map syntax overly complex. The core data handlers are relied upon to perform complete validation of all reconfiguration data passed to the KSU from the PC. The KSU's response to the GetStatus request indicates if the operation was successful or not.

What is claimed is:

1. An Operations, Administration, and Maintenance (O&AM) system for a network communication core having a switch, a controller, and a core configuration memory, comprising:

an off-core map storing static information comprising features, which features are for configuring said core;

an off-core server for receiving an off-core OA&M request and for, initially, looking to said off-core map for information to respond to said request and, if information is found in said map to respond to said request, responding to said request with said information and, if information is not found in said map to respond to said request, constructing a function to said off-core OA&M request to said controller and for responding to said off-core OA&M request based on a response from said controller to said function.

2. The OA&M system of claim 1 wherein said information from said map to respond to said request comprises validation information permitting subsequent entry of a validated off-core OA&M request and wherein said server is for constructing a function to pass any said validated off-core OA&M request to said controller and for responding to said validated off-core OA&M request based on a response from said controller to said function.

3. The OA&M system of claim 2 wherein said off-core map stores information organising said features into a hierarchical tree.

4. The OA&M system of claim 3 wherein said features comprise one of a homogeneous list feature, a heterogeneous list feature, a choice attribute feature, an edit attribute feature, and an action feature.

5. The OA&M system of claim 4 wherein, when said off-core OA&M request comprises a request for a next level of said hierarchical tree, said server responds with information from said map comprising said next level of said hierarchical tree.

6. The OA&M system of claim 4 wherein, when said off-core OA&M request comprises a request to change a choice attribute feature, said server responds with information from said map indicating the possible choices for said choice attribute feature prompting the input of a validated off-core OA&M request.

7. The OA&M system of claim 4 including a general purpose computer for entry of said off-core OA&M requests.

8. A method for permitting Operations, Administration, and Maintenance (O&AM) in a network communication core having a switch, a controller, and a core configuration memory, comprising the steps of:

storing in an off-core map static information comprising features, which features are for configuring said core;

receiving off-core an off-core OA&M request;

responsive to said off-core OA&M request, initially looking to said off-core map for information to respond to said request and, on finding information in said map to respond to said request, responding to said request with said information and, on not finding information in said map to respond to said request, constructing a function to pass said off-core OA&M request to said controller and responding to said request based on a response from said controller to said function.

9. The method of claim 8 wherein said information from said map to respond to said request comprises validation information permitting subsequent entry of a validated off-core OA&M request and comprising the step of, on receiving a validated off-core OA&M request, constructing a function to pass said validated off-core OA&M request to said controller and responding to said validated off-core OA&M request based on a response from said controller to said function.

* * * * *

UNITED STATES PATENT AND TRADEMARK OFFICE
CERTIFICATE OF CORRECTION

PATENT NO. : 5,907,537
DATED : May 25, 1999
INVENTOR(S) : Mario R. J. Papineau et al.

It is certified that error appears in the above-identified patent and that said Letters Patent is hereby corrected as shown below:

Column 10, Line 9, replace "respond to said request, constructing a function to said" with --respond to said request, constructing a function to pass said--.

Signed and Sealed this

Fifth Day of October, 1999

Q. TODD DICKINSON

*Attest:*

*Attesting Officer*          Acting Commissioner of Patents and Trademarks